United States Patent [19]

Cestero

[11] Patent Number: 4,715,181

[45] Date of Patent: Dec. 29, 1987

[54] DEVICE TO CONVERT PISTON-RECIPROCATING INTERNAL COMBUSTION ENGINES TO COMPRESSED AIR MOTORS

[76] Inventor: Luis G. Cestero, Parque San Patricio 2, Caparra Heights, San Juan (00936), P.R.

[21] Appl. No.: 923,595

[22] Filed: Oct. 27, 1986

[51] Int. Cl.[4] ........................ F16D 31/02; F01B 29/04

[52] U.S. Cl. ........................................ 60/412; 60/416; 91/54; 123/DIG. 7

[58] Field of Search ...................... 91/54; 60/370, 407, 60/412, 416; 123/22, 179 F, DIG. 7, 1 R

[56] References Cited

U.S. PATENT DOCUMENTS

| | | | |
|---|---|---|---|
| 2,244,384 | 6/1941 | Bissinger | 60/416 X |
| 2,591,641 | 4/1952 | Troendle | 60/416 X |
| 3,379,008 | 4/1968 | Manganaro | 60/412 X |
| 3,847,058 | 11/1974 | Manor | 60/370 X |
| 3,885,387 | 5/1975 | Simington | 123/DIG. 7 X |
| 3,890,996 | 6/1975 | Burckhardt | 60/416 X |
| 3,925,984 | 12/1975 | Holleyman | 60/370 |
| 4,018,050 | 4/1977 | Murphy | 60/370 |
| 4,292,804 | 10/1981 | Rogers, Sr. | 60/407 |
| 4,478,304 | 10/1984 | Delano | 60/416 X |
| 4,608,824 | 9/1986 | Gagnon | 60/412 X |

FOREIGN PATENT DOCUMENTS

| | | | |
|---|---|---|---|
| 2468004 | 5/1981 | France | 60/370 |

*Primary Examiner*—Robert E. Garrett
*Assistant Examiner*—Mark A. Williamson
*Attorney, Agent, or Firm*—Scrivener and Clarke

[57] ABSTRACT

A device carrying air reservoir means and a compressor is adapted to be mounted on a conventional four cycle internal combustion engine to convert it to operation by air pressure. The device has air pressure reservoirs, valves and conduits for delivering air pressure to the cylinders of an engine in timed sequence. After each power stroke air is exhausted to the inlet of a compressor carried by the device which delivers the compressed exhaust air back to the reservoirs and in doing so adds to the exhaust air energy substantially equal to the useful work output of the engine.

4 Claims, 2 Drawing Figures

Figure 2:
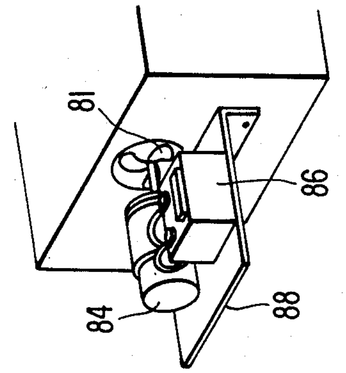

DEVICE TO CONVERT PISTON-RECIPROCATING INTERNAL COMBUSTION ENGINES TO COMPRESSED AIR MOTORS

BACKGROUND OF THE INVENTION

Efforts are being made to substitute the existing energy wasteful-contaminating internal combustion engine for an energy saving-ecologically superior compressed air motor. While this is attained, efforts should be made to convert the existing piston internal combustion engines to compressed air-power plants. This will have the following advantages:

1. It will provide a transitional period from one type of engine to another.
2. The existing piston internal combustion engines will not be wasted.
3. Further damage to the environment is avoided while the internal combustion engine is finally substituted.

The petroleum and transportation companies derive their substantial economic status and power from the internal combustion engine; which is the engine that most commonly transform heat to work. It should not be expected that they come with a substitute of the engine from which they derive their power and influence: this has to be done by individuals who suffer the ecological and economical inconveniences of the internal combustion engine.

THE PRIOR ART

U.S. Pat. No. 3,885,387 to Garnet J. Simington is pertinent to the present invention. In the Simington's device, compressed air with unspecified thermodynamic properties is supplied to the cylinder of a converted reciprocating-piston internal combustion engine through the spark plug holes to supply the power strokes of the cylinders. The engine's motive fluid is compressed air from a compressed air tank supplied by a compressor driven by a gasoline engine or by an electric motor powered by a battery.

In Simington's invention, compressed air from the tank is provided to the cylinder during each work stroke, reducing the air mass in the tank in direct proportion to that supplied to the cylinder. At the end of the work stroke, the engine's exhaust valve opens and the motive fluid is expelled to the outside as non-contaminating exhaust gases.

From Simington's disclosure (Col. 3, line 54) states "All air in cylinder 56 is exhausted to atmosphere on the exhaust stroke." By so doing, most of the energy of the motive fluid (the heat not transformed to work) is wasted. The second principle of thermodynamics states that only a fraction of the heat energy supplied to an engine is converted to work, the rest being expelled in the exhaust gases. From *Principles of Physics* by Sears-Zemansky (Chapter 20, page 32, Second Law of Thermodynamics) it is quoted:

> "Stack and friction losses account for only a small part, by far the largest part appearing as heat rejected in the exhaust. No one has ever constructed a heat engine which does not throw away in its exhaust a relatively large fraction of the heat supplied to it, and it is safe to say that no one ever will. The impossibility of constructing an engine which with no others outstanding changes will convert a given amount of heat completely to mechanical work is a fundamental law of nature known as the Second Law of Thermodynamics.

The Simington engine is unable to convert all the heat received during the work stroke to mechanical work, and a relatively large fraction of that heat energy is retained in the exhaust. By exhausting to the outside, the Simington has to return to the compressed air tank the mass of air previously exhausted containing both the heat transformed to work and that contained by the exhaust, in order to prepare the tank for the next work stroke. This is inefficient.

The broad object of the present invention is to provide a compressed air adapter for a conventional internal combustion engine wherein the energy rich exhaust gases are not exhausted to atmosphere but are collected to be transferred back to the compressed air storage tank by a compressor driven by an electric motor powered by a battery.

SUMMARY OF THE INVENTION

The invention is concerned with converting a piston-reciprocating internal combustion engine into a compressed air power plant. The conversion is achieved by removing the carburetor and electric system, including the spark plugs and re-arranging the exhaust manifold from the internal combustion motor. Otherwise the engine remains a four cycle-reciprocating engine with any number of cylinders operating on admission, compression, work, exhaust stroke cycle, although for purposes of this disclosure, the engine is a four cylinder motor having a cylinder block that houses the cylinders with their sliding pistons attached to a crankshaft with a flywheel, and a valve operating block that houses the valve means that opens and shuts in a predetermined sequence, the admission and exhaust valves located on the heads of the respective cylinders.

For a four cylinder engine, the device comprises four compressed air compartments located two at each side of a central compressed air chamber with transfer valve means being located under the respective compressed air compartments. The transfer valve means are connected by a cam and belt to the engine's flywheel to open and close to interconnect the compressed air compartments with the engine's cylinders. The transfer valves are in open position at the start of the work stroke of the engine's cylinders and shuts shortly before or at the end of this stroke. The engine's exhaust gases are guided to a compressor powered by a battery that transfer the gases back to the central compressed air chamber from where the gases move spontaneously to the compressed air compartment of lowest pressure. This will return this compartment to the original thermodynamic conditions, thus preparing it for next work stroke.

The compressed air compartments and the cylinders of the engine are interconnected by insulated conduits and plugs screwed to the valve housings and to the holes of the spark plugs. The compressor and central chamber are interconnected to an exhaust manifold by conduits and plugs.

For purposes of the following description the converted motor will be referred to as "engine"; and the air compartments, central chamber, valve means with conduits, plugs; compressor and battery will be referred to as "device".

Figure 1:
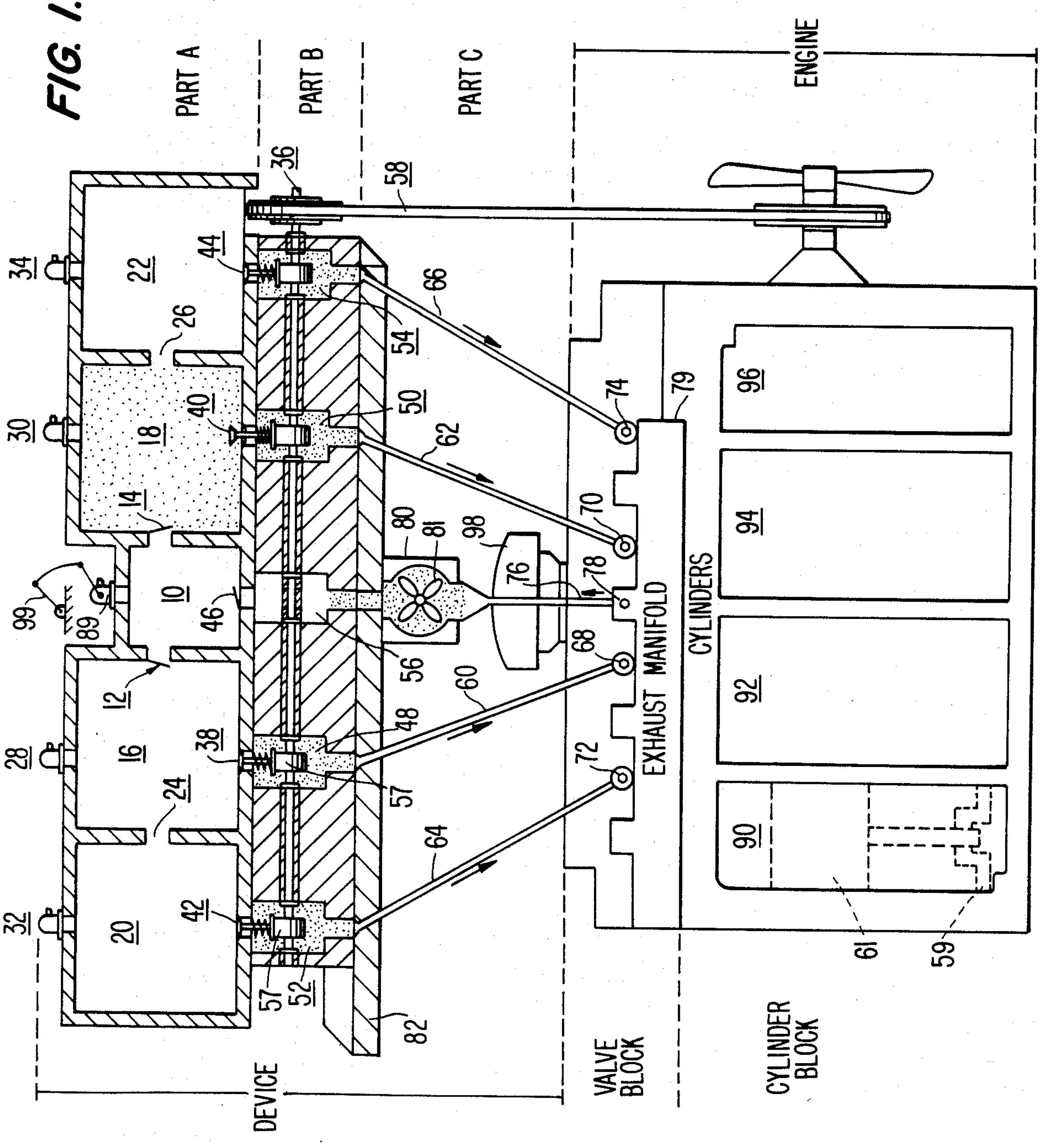

The invention will be better understood when the following detailed description is read in conjunction with the accompanying drawings wherein:

FIG. 1 is a vertical sectional view of the conversion device of the invention as applied to a substantially schematically illustrated conventional converted internal combustion engine; and FIG. 2 is a perspective view of the rotary compressor and its supporting means.

DESCRIPTION OF THE PREFFERED EMBODIMENT OF THE INVENTION

The Device Components

The preferred embodiment of the device provided by the invention is disclosed in the drawings and comprises in general three sections denominated from top to bottom Part A, Part B and Part C. Part A houses the compressed air reservoir means; Part B houses the valve operating camshaft and the valves which control the transfer of compressed air to the engine's cylinders and Part C comprises the rotary compressor and the conduits that interconnect the device and the engine.

The reservoir tier A comprises a central chamber 10 connected through outwardly pivoted flap valves 12, 14 to intermediate chambers 16, 18 which are positioned at the opposite sides of chamber 10, and which are connected respectively to outer chambers 20, 22 through open ports 24, 26. Chambers 16, 18, 20, 22 are vented to the outside through safety valves 28, 30, 32, 34, respectively.

Lower tier B lies under reservoir tier A and houses camshaft 36, the cams mounted on it and normally closed transfer valves 38, 40, 42, 44 which are operated by the cams to connect reservoir tier A with engine's cylinders through the spark plugs holes. These valves and their functions are described as follows:

Transfer valves 38–44 are operative to transfer compressed air from air compartments 16–22 to the engine's cylinders during their work stroke at the right time. Admission valve 46, preferably a flap valve as shown, which controls flow to chamber 10, is in open position when the rotary compressor returns the engine's exhaust air to the central chamber 10, but is otherwise closed.

Valves 38–44 are positioned in valve housings 48, 50, 52, 54 as shown in the drawings, and all are of the common normally closed, spring loaded type and are operated to open position by cams 57 on camshaft 36 which is connected by belt 58 to the engine's crankshaft 59, partly shown by dashed lines in FIG. 1, to cause the valve to operate in a predetermined sequence. Valves 38–44 are opened and closed at the beginning and at the end of the work stroke of the engine's respective pistons 61. Admission valve 46 is opened and closed at the start and at the end of the exhaust strokes of the engine's respective pistons.

Part C comprises those parts that interconnect the device with the engine. Insulated rigid metallic conduits 60, 62, 64, 66, connect valve housings 48, 54, to spark plug holes 68, 70, 72, 74. Those conduits have suitable connecting plugs at both ends to be either screwed or plugged into the housings and to the spark plug holes. Rigid metallic conduit 76 connects one opening 78 of the engine's exhaust manifold 79, inverted for purposes of the invention, to housing 80 of a rotary compressor fan 81.

The device of the invention rests over a mounting console 82 which is supported above the engine at the shortest distance possible from the spark plug openings. Housing 80 of the compressor fan 81 is attached to the bottom of the console 82 directly below the housing 56 for the compressed air admission valve 46. The rotary compressor 81 is powered by an electric motor 84 (FIG. 2) connected to a battery 86 as an outside source of energy. The motor and battery are carried on a support 88 attached to both the engine and the device. A throttle valve 89 is placed on the head of the central chamber 10 to control the speed of operation of the engine and the device as more fully described hereinafter.

The rotary compressor has two functions:

1. To totally extract the exhaust compressed air from the engine's cylinders and prepare them for a subsequent admission stroke; and 2. To transfer the compressed exhaust air to the corresponding air chamber 16, 18, 20, or 22 via the central chamber 10.

The diameter of all inter-connecting conduits 60–64 is the same as that of the engine's spark plugs holes to allow a free, unobstructed passage of compressed air to the cylinders. The same is true of the conduits and plugs that interconnect the engine's exhaust manifold 79 to housing 80 of the fan compressor 81 and from there to the central chamber 10.

The Compressed Air Compartments as a Heat Energy Reservoir

Part A of the device comprises four identical compressed air compartments 16, 20 and 18, 22 positioned at each side of the central chamber 10 which is common to all. Compartments 16, 20 are contiguous and interconnected by the open port 24 and compartments 18, 22 are also contiguous and interconnected by the open port 26.

This embodiment of the device is designed as described above because it serves a conventional four cylinder internal combustion engine though the engine could have any number of cylinders. Two compressors, however, would be needed in the case of an eight cylinder motor, each powered by a battery and each serving four cylinders of the engine.

The shape of the central chamber and compartments will depend exclusively on space saving requirements. In one embodiment constructed in accordance with the invention they are tridimensional with the following measurements and volumes.

| Compartment Compressed air | Length | Width | Height | Volume |
|---|---|---|---|---|
| Compartments 16, 18, 20, 22 | 20 cms. | 15 cms. | 10 cms. | 3,000 cc. |
| Central chamber 10 | 20 cms. | 5 cms. | 5 cms. | 500 cc. |

The thermodynamic properties of the central chamber 10 and of the compressed air compartments will be specified when occupied by a volume of air equivalent to their physical volumes and as compressed air systems. For brevity, the properties of the central chamber 10 and of compressed air compartment 18 are hereafter analyzed but what is said of compressed air compartment 18 is true of the others.

The thermodynamic properties of the central chamber 10 as filled with 500 cc. of air and as a compressed air system formed by squeezing 15167 cc. of outside air to make a total volume of 15667 cc. of air inside central chamber 10 are as follows:

| | As a Normal Air System | As a Compressed Air System |
|---|---|---|
| Chamber's 10 volume | 500 cc. | 500 cc. |
| Volume of air | 500 cc. | 15667 |
| Mass: V × D | 0.65 gr. | 20.37 grs. |
| Density: M ÷ V | 0.0013 gr./cc. | 0.0407 gr./cc. |
| Pressure | 1 atmosphere | 124.3 atms. |
| Temperature | 0° C. = 273° K. | 1082° K. = 809° C. |
| Compression Ratio | 1:1 | 31.33:1 |

The thermodynamic properties of compressed air compartment 18 as filled with 3,000 cc. of air and as a compressed air system formed by squeezing 91,000 cc. of additional outside air to make a total volume of 94,000 cc. of air inside compartment 18 are as follows:

| | As a Normal Air System | As a Compressed Air System |
|---|---|---|
| Compartment's 18 volume | 3,000 cc. | 3,000 cc. |
| Volume of air | 3,000 cc. | 94,000 cc. |
| Mass: V × D | 0.65 gr. | 122.2 grs. |
| Density: M ÷ V | 0.0013 gr./cc. | 0.0407 gr./cc. |
| Pressure | 1 atmosphere | 124.3 atms. |
| Temperature | 0° C. = 273° K. | 1082° K. = 809° C. |
| Compression Ratio | 1:1 | 31.33:1 |

The Converted Engine

Table 1

The engine is a piston reciprocating-internal combustion engine converted into a compressed air power plant. This conversion is attained by removing the motor's carburetor, the electric system of the engine, including the spark plugs and converting the exhaust system that throws the energy-rich and normally contaminating hydrocarbon exhaust gases into the surrounding atmosphere. For the rest, the engine remains a piston reciprocating engine having four cylinders generally designated by the numerals 90, 92, 94, 96 which works in a four cycle sequence: admission, compression, work and exhaust strokes. Air alone is admitted into the cylinders during the intake strokes through its air cleaning filter 98 which is retained, and conventional inlet valves (not shown).

Table 2

Though they could vary, for purposes of this disclosure, the engine's crankshaft and pistons are arranged as in the following table: that is, the pistons of cylinders 90 and 94 are on their top dead center (T.D.C.) while pistons of cylinders 92 and 96 are on their bottom dead center (B.D.C.). For purposes of this disclosure, the engine's cylinders have an area of 50.0 sq. cms. and an altitude of 10 cms. for a volume of 500 cc.; their compression ratios is 9:1 and they work in the following sequence:

| Cylinders | Sequence of Events |
|---|---|
| Piston of Cyl. 90 | A-C-W-E-[1] |
| Piston of Cyl. 92 | C-W-E-A |
| Piston of Cyl. 94 | W-E-A-C |
| Piston of Cyl. 96 | E-A-C-W |

[1]A = admission
W = work
C = compression
E = exhaust

The engine has a work stroke order of 3-2-1-4, with one work stroke for every half turn of the shaft (180°), two work strokes for every turn of the shaft (360°); three work strokes for every 1½ turn (540°) and four work strokes for every two turns of the shaft (720°).

The predetermined sequence of the engine's valves (not shown) is conventional as follows:

Valves of Cylinder 90: The admission valve is in open position during the intake stroke; both it and the normal exhaust valve are closed during the compression and work strokes and the exhaust valve is open during the upwards exhaust stroke.

Valves of Cylinder 92: Both exhaust and admission valves are closed during the compression and work strokes, the exhaust valve is in open position and the admission valve is closed during the exhaust stroke; and vice-versa during the admission stroke.

Valves of Cylinder 94: Both valves are in closed position during the work stroke; the exhaust valve is in open position and the admission valve in closed position during the exhaust stroke; and vice-versa during the admission stroke, both valves being shut during the compression stroke.

Valves of Cylinder 96: The exhaust valve is open and the admission valve closed during the exhaust stroke and vice-versa during the admission stroke; both valves are closed during the compression and work strokes.

Cylinder 94 is fed by device's compressed air compartment 18, as the latter is placed above that cylinder and both are interconnected by the corresponding valves and conduits. To simplify this part of the operation description, only the combined operation of cylinder 94 and compressed air compartment 18 is described, as the others cylinders will work exactly in the same way although at different times. Cylinders 92, 90, and 96 will be fed by air compartments 16, 20 and 22, respectively.

The engine has a conventional auxiliary electric starting motor (not shown) powered by a battery (not shown) in order to execute the initial admission and compression strokes. The device's central chamber 10 and compartment 18 are assumed ready to work in conjunction with engine cylinder 94.

Admission and Compression Strokes

With the engine's conventional admission valve open, exhaust valve closed, and device valve 40 closed, cylinder 94 starts its intake stroke powered by the auxiliary starting motor and battery. This is a descending stroke and when the piston arrives to its bottom dead center, cylinder 94 will be filled with 500 cc. of outside air with the following thermodynamic properties:

| | |
|---|---|
| Volume of Cylinder | 500 cc. |
| Volume of air admitted | 500 cc. |
| Density of outside air | 0.0013 gr./cc. |
| Mass: D × V | 0.65 gr. |
| Pressure | 1 atmosphere/ sq. cm. |
| Temperature (assumed) | 0° C. = 273° K. |

With all valves closed, the piston of cylinder 94 executes its upwards compression stroke with a compression ratio of 9:1, reducing the outside air admitted to a second volume of 55.56 cc. The new thermodynamic properties inside cylinder 94 at the end of the compression stroke are as follows:

| | |
|---|---|
| Volume of compressed air | 55.56 |
| Mass | 0.65 gr. |
| Density: M ÷ V | 0.0117 gr./cc. |
| Pressure[1] | 21.67 atms./ sq. cm. |
| Temperature[1] | 657.5° K. = 384° C. |
| Compression ratio | 9:1 |

[1]Calculations of these properties by the Sears-Zemansky equations appear in the Addenda of this Disclosure.

Work Stroke

At the end of the piston's compression stroke, outlet valve 40 of compressed air compartment 18 opens, connecting the latter with cylinder 94. It is considered convenient to put side-by-side the thermodynamic properties of both the compressed air compartment 18 and of cylinder 94 at the end of its compression stroke in order to facilitate the understanding of what happens during the next work stroke.

| Properties | Compartment 18 | Cylinder 94 |
|---|---|---|
| Mass of air | 122.2 grs. | 0.65 gr. |
| Density | 0.0407 gr./cc. | 0.0117 gr./cc. |
| Pressure | 124.3 atms./sq. cm.[1] | 21.67 atms./sq. cm.[1] |
| Temperature | 1082° K. = 809° C.[1] | 657° K. = 384° C.[1] |

[1]Calculations of these properties by the Sears-Zemansky equations appear in the Addenda of this Disclosure.

Compressed air mass and heat energy will be transferred spontaneously and continuously from compartment 18 to cylinder 94 because the thermodynamic properties of the former are always higher than those of the latter, except when the work stroke finishes, at which point they become equal. In order to understand what takes place in the cylinder during the work stroke, one must imaginarily stop the piston of cylinder 94 when it reaches bottom dead center and with valve 40 of compressed air compartment 18 still in open position.

Under these conditions, there is a compressed air system comprising a volume of 3500 cc. (combined volumes of compartment 18 and clyinder 94) containing a total compressed air mass of 122.85 grs. (mass of compartment 18 plus mass of cylinder 94).

The thermodynamic properties of such compressed air system are the following:

| | |
|---|---|
| Volume | 3500 cc. |
| Mass | 122.85 grs. |
| Density: M ÷ V | 0.0351 grs./cc. |
| Pressure | 100.9 atms./sq. cm.[1] |
| Temperature | 1021° K. = 748° C.[1] |
| Compression ratio | 27:1 |

[1]Calculations of these properties by the Sears-Zemansky equations appear in the Addenda of this Disclosure.

This means that under these circumstances compartment 18 and cylinder 94 will be filled with compressed air having these properties. This also means that while compartment 18 experienced a decrease in pressure and temperature (from 124.3 atms./sq. cm. to 100.9 atms./sq. cm. and from 1082° K.=809° C. to 1021° K.=748° C.), cylinder 94 experienced an increase in pressure and temperature from 21.67 atms./sq. cm. to 100.9 atms./sq. cm. and from 657° K.=384° C. to 1021° K.=748° C. This reduction in pressure and temperature of compartment 18 and gain in pressure and temperature by cylinder 94 is the result of the continuous and spontaneous yielding of mass and heat energy by compartment 18, mass and heat that is spontaneously and continuously received by cylinder 94.

This also means that at the end of the work stroke, cylinder 94 will be filled with 500 cc. of compressed air with a density of 0.351 gr./cc. Consequently, the mass inside cylinder 94 is 17.55 grs. (500 cc.×0.0351 gr./cc.). As 0.65 gr. of this total came from the outside, then the mass ceded by compartment 18 to cylinder 94 to execute the work stroke was 16.90 grs.

The density of the compressed air executing the work stroke is at all times 0.0351 gr./cc.; and this means that initially the amount of mass needed to achieve this density was 1.30 grs.; which tripled the mass to 1.95 grs. when the volume of cylinder 94 was 55.56 cc. From that moment on, the spontaneous and continuous transference of mass and heat executing the work stroke does not increase the thermodynamic properties already formed, but merely keeps them constant. This subsequent mass and heat energy comprises eight nineths of the total mass and energy executing the work stroke; the other nineth is the heat transformed to mechanical work.

At the end of the work stroke, valve 40 of compartment 18 shuts, and the thermodynamic properties in both compartment 18 and cylinder 94 are presented in a tabular form as follows:

| Properties | Compartment 18 | Cylinder 94 |
|---|---|---|
| Volume | 3,000 cc. | 500 cc. |
| Mass of air | 105.30 grs. | 17.55 grs. |
| Density | 0.0351 grs./cc. | 0.0351 grs./cc. |
| Pressure | 100.9 atms./sq. cm. | 100.9 atms./sq. cm. |
| Temperature | 1021° K. = 748° C. | 1021° K. = 748° C. |
| Compression ratio | 27:1 | 27:1 |

Before proceeding further, it is convenient to calculate the work performed during the work stroke, something that can be done by two simple equations. It has been proven that the work stroke is executed at a constant pressure of 100.9 atms./sq. cm., which is equivalent to 104.23 kilogrammeters/sq. cm.

The equations for calculate work (W) are the following:

Force=pressure×area

Therefore: Force=104.23 kgs.×50.0 sq. cms.=5211.485 kgs.

Work=Force×distance $$\text{As distance} = \frac{10 \text{ cms.}}{9} \times 8 = \frac{8.889 \text{ cms.}}{100 \text{ cms.}} = 0.089 \text{ meter}$$

Therefore: 5211.485 kgs.×0.089 m.=463.243 kilogrammeters

From Sears-Zemansky (Principles of Physics, Chapter 20, Second Law of Thermodynamics page 322) it is quoted:

"... The first law, it will be recalled, is a statement of the principle of conservation of energy, and merely imposes the restriction that one can obtain no more than 427.12/ kilogrammeters of work from every kilocalory of heat."

Therefore the heat transformed to work is 1.085 kilocalory (463.243 kgms.÷427.1 kgms./kcal.2/). As the heat transformed to work is 1/9 of the total heat supplied, then to the total heat supplied to execute the work stroke is 9.762 kilocalories; and 8/9 of that amount or 8.677 kcals. of heat remains in the exhaust. Please refer to the quotation from Sears-Zemansky on page 2 of this specification.

The Exhaust Stroke

As mentioned, at the end of the work stroke, valve 40 of compressed air compartment 18 shuts. Simultaneously, the exhaust valve of cylinder 94 opens. The energy rich exhaust gases are drawn out of cylinder 94 by the upwards stroke of the piston of cylinder 94 and by the sucking action of the rotary compressor 81 powered by the battery 86, which started working simultaneously at the start of the cylinder 94 exhaust stroke. This will extract all the mass of exhaust gases from the cylinder, preparing it for another admission stroke.

If the described engine-device were an internal combustion engine, it would throw the energy-rich exhaust gases to the surrounding atmosphere because there is no way to recirculate them. By so doing, an internal combustion replica of the described engine-device combination would be wasting 8/9 of the total energy supplied to execute the work stroke which is equivalent to 8.677 kcals. of heat energy. Consequently, it will require another 9.762 kcals. to execute the following work stroke.

The described engine-device of the invention collects the energy rich exhaust gases containing 8.677 kcals. of heat, and the compressor exerts mechanical work upon the mass of exhaust gases to transfer that mass back to the central chamber 10 and from there to compartment 18. In the process, the compressor provides the 1.085 kilocalory of heat transformed to work, equivalent to 463.243 kgms. of work. In other words, the engine's work output has to be returned back by the compressor powered by a rechargeable battery, something that is common for all types of engines, and specifically of internal combustion power plants. For instance, if a piston internal combustion engine is worked at constant revolutions per minute, its heat requirements will always be the same and is the sum of the heat transformed to work plus the heat wasted in the exhaust. But in the case of the present invention, the exhaust gases contain 8.677 kcals. of heat which are not wasted. This heat energy has a mechanical work equivalence of 3705.95 kgms., or at a rate of 427.1 kilogrammeters of work per kilocalory of heat. It is reasonable to invest a little more than 463.243 kgms. of work by the compressor to conserve the 8.677 kcals. of heat equivalent to 3705.95 kgms. of work.

In a tabular form, a heat energy analysis is made to compare that of the inventional and an internal combustion engine replica:

| | Internal Combustion Replica | Invention |
|---|---|---|
| Heat required to execute a work stroke | 9.762 kcals. | 9.762 kcals. |
| Heat transformed to work | 1.085 kcals. | 1.085 kcals. |
| Heat in exhaust | 8.677 kcals. | 8.677 kcals. |
| Heat wasted in exhaust gases | 8.677 kcals. | None |
| Heat required for next work stroke | 9.762 kcals. | 1.085 kcals. |

As mentioned, compressor 81 powered by a battery will transfer the 17.55 grs. of exhaust gases to central chamber 10, providing in the process the 1.085 kilocalory transformed to mechanical work. It must be remembered that compartment 18 provided 16.90 grs. and 0.65 grs. came from the surroundings during cylinder 94's intake stroke. This mass is returned to the atmosphere through safety valve 30.

The invention has to be viewed from the perspective that it does not throw the exhaust to the outside as in Simington's, and more importantly, still, as in existing internal combustion engines. The engine-device combination of the invention makes possible the recycling of the energy-rich exhaust gases, something impossible for existing internal combustion engines. Recycling is today common practice with certain solids such as metals and papers; and that of the energy-rich exhaust gases of an engine should not be an exception.

ACCELERATION-DECELERATION OF ENGINE-DEVICE

The work performed by the invention was calculated as 423 kilogrammeters of work for every power stroke. This work output is, however, at the engine's full capacity. Power plants, when started, begin at low or idle speed and from there they are accelerated through intermediate functional stages to full working performances. It is necessary, therefore, to determine subject engine's idle functioning stage.

As previously, only the combined operation of cylinder 94, air chamber 10, compartment 18 and related conduits and valves will be described; as the other cylinders in combination with the corresponding air compartments and related conduits and valves all work the same way although at different times.

Cylinder 94 works at a compression ratio of 9:1; something that cannot be altered. Compartment 18, as a compressed air system ready to work combinely with cylinder 94, has a compression ratio of 31.33:1. This compression ratio is reduced to 27:1 when the work stroke of cylinder 94 comes to an end. It can be increased and reduced from its lowest to its highest point and vice-versa by the provision on the head of central chamber 10 of the previously mentioned throttle-valve 89, pedally or manually operated.

The valve 89 will be in open position when the pedal or manual lever 99 is in its highest position, allowing the compressed air in central chamber 10 to exhaust out in such an amount as to permit cylinder 94 to work on its normal compression ratio of 9:1. In that instant, safety valve 30 does not work, as this valve functions only when compartment 18 is at optimum thermodynamic conditions that permit the escape of the extra mass admitted during the engine's admission stroke. This extra mass of outside air (500 cc.=0.65 gr.) will always be admitted (as the engine keeps on working on its usual four stroke sequence) but in low gear operation all exhaust is performed by the accelerating throttle valve 89.

In case of an automobile, if the pedal 99 is pushed down it will close the throttle valve 89, increasing the amount of air mass in chamber 10 and in compartment 18; with an accelerating effect on the engine. When the pedal is pushed down completely, the accelerating throttle valve shuts and the air admitted from outside during the engine's admission stroke accumulates in chamber 10 and compartment 18 until maximum conditions are achieved whereupon the engine works at full capacity and the extra mass is exhausted to the outside by safety valve 30.

Calculations indicate that the lowest compression ratio in central chamber 10 and in compartment 18 to permit a low-gear operation of cylinder 94; is 10.33:1. With this compression ratio the thermodynamic properties of compartment 18 are the following:

| | |
|---|---|
| Volume of compartment 18 | 3,000 cc. |
| Compression ratio | 10.33:1 |
| Volume of air inside compartment: 3,000 cc. × 10.33 | 30990 cc. |
| Mass: V × D = 30990 cc. × 0.0013 gr./cc. | 40.287 grs. |
| Density: M ÷ V = 40.287 grs. ÷ 3,000 cc. | 0.0134 gr./cc. |
| Pressure | 26.28 atms./sq. cm. |
| Temperature | 694° K. = 421° C. |

The thermodynamic properties of cylinder 94 when the piston is at top dead center at the end of the compression stroke, have been already calculated and are presented jointly with those of compartment 18 in a tabular form for the reader to understand the events that follow when these two compressed air systems get in contact:

| | Compartment 18 | Cylinder 94 |
|---|---|---|
| Volume | 3,000 cc. | 55.56 cc. |
| Mass of air | 40.287 grs. | 0.65 grs. |
| Density | 0.0134 gr./cc. | 0.0117 gr./cc. |
| Pressure | 26.28 atms./sq. cm. | 21.67 atms./sq. cm. |
| Temperature | 694° K. = 421° C. | 657.5° K. = 384.5° C. |
| Compression ratio | 10.33:1 | 9:1 |

The thermodynamic properties in compartment 18 are higher than those of cylinder 94 and this will permit a spontaneous and continuous flow of mass and heat energy from compartment 18 to cylinder 94 until the work stroke of the latter comes to an end. At this juncture, the calculations of the thermodynamic properties in compartment 18 and cyilinder 94 are as follows:

| | |
|---|---|
| Volume: 3000 cc. + 500 cc. | 3500 cc. |
| Mass: 40.287 grs. + 0.65 gr. | 40.937 grs. |
| Density: M ÷ V | 0.0117 gr./cc. |
| Pressure | 21.67 atms./sq. cm. |
| Temperature | 657.5° K. = 384.5° C. |
| Compression ratio | 9:1 |

This analysis proves that the thermodynamic properties in compartment 18 and in cylinder 94 are the same at the end of the latter's work stroke. A spontaneous and continuous flow of mass and heat from compartment 18 to cylinder 94 reduced the thermodynamic properties of the former but kept constant those of the latter.

At maximum working capacity, the compression ratios of chamber 10, cylinder 94 and compartment 18 is 27:1. Consequently the lowest and highest functional points of the invention are represented by compression ratios of 10.33:1 and 27:1 respectively. The difference between these compression ratios represent the intermediate functional stages of subject engine-device.

ADDENDA

Computations

The calculations of the thermodynamic properties of the motive fluid that executes the work stroke is a necessary requisite in the disclosure of any invention of a compressed air engine or of a device to convert internal combustion engines to compressed air power plants. If the motive fluid properties are not predetermined; the work stroke is either not performed or executed deficiently.

Computations in Table 1

Thermodynamic properties of chamber 10 when occupied by 500 cc. of air and as a compressed air system when occupied by 15667 cc. of air.

Volume, Mass and Density

Volume (V); mass (M) and density (D) are factors that are inter-related by simple equations. Therefore:

$$V = \frac{M}{D}\text{; or}$$

$$M = V \times D\text{; or}$$

$$D = \frac{M}{V}$$

In Table 1 (chamber 10 as a normal air system, vertical figures); the density of air is given fact: Sears-Zemansky gives it as 0.0012929 gr./cc.; applicant rounds this figure to 0.0013 gr./cc. Consequently, the mass in chamber 10 when containing 500 cc. of air is 0.65 gr. (500 cc.×0.0013 gr./cc.).

As a compressed air system, the mass in chamber 10 is the product of the total volume of air confined within chamber 10 multiplied by 0.0013 gr./cc.; or 20.37 grs. The density of this mass when squeezed in chamber 10 is 0.0407 grs./cc. (20.37 grs.÷500 cc.).

Pressure, temperature and compression ratios

In Principles of Physics (Chapter 19, Thermal Properties of Matter, page 307 included) Sears-Zemansky presents a problem which in metric terms is as follows:

> The compression ratio of a diesel engine V1/V2 is about 15. If the cylinder contains air at one atmosphere 1/sq. cm. (absolute) and 15° C. (288° K.) at the start of the compression stroke, compute the pressure and temperature at the end of this stroke. Assume that air behaves like an ideal gas and that compression is adiabatic. The value for the specific heat of air (λ) is 1.40.

1/In the text, Sears-Zemansky uses 15 lbs./sq. inch which is equal to 1.0207 atms./sq. cm.

In metric terms, the solution to Sears-Zemansky's pressure problem is 44.31 atms./sq. cm.; equivalent to 651.2 lbs./sq. inch (44.31 atms./sq. cm.×14.696 lbs./sq. inch). This result is very similar to that of the text; the difference due to the rounding of figures. In metric terms; the solution to the temperature problem is 851°0 K. and 578° C.; equivalent to 1564° F. absolute and 1072° F. respectively; results very similar to those of the text.

In this disclosure chamber 10 is not a cylinder and does not have moving parts. It is assumed as one having an area of 200 sq. cms. and an altitude of 78.335 cms.; for a volume of 15667 ccs. This first volume is reduced to a second one of 500 cc. by a sliding piston; or at a compression ratio of 31.33:1. By this logical reasoning chamber 10 and compartment 18 are adapted to Sears-Zemansky's equations and their pressures and temperatures are calculated following the guides of a recognized authority.

The pressure inside chamber 10 as a compressed air system is calculated by Sears-Zemansky's equation as follows:

$$p2 = p1\left(\frac{V1}{V2}\right)$$

$$\log p2 = \log p1 \neq \left(\times \log\frac{V1}{V2}\right)$$

$$= \log 1 \neq (1.40 \times \log 31.33)$$

$$= 0 \neq (1.40 \times 1.4959) = 2.0943$$

$$p2 = \text{antilog } 2.0943 = 1243$$

$$p2 = 124.3 \text{ atms./sq. cm.}$$

By Sears-Zemansky's equation, the temperature inside chamber 10 as a compressed air system is calculated as follows:

$$T2 = T1\left(\frac{V1}{V2}\right) - 1$$

$$\log T2 = \log T1 \neq \left(0.4 \times \log\frac{V1}{V2}\right)$$

$$= \log 273 \neq (0.4 \times \log 31.33)$$

$$= 2.4362 \neq (0.4 \times 1.4959)$$

$$= 2.4362 \neq 0.5987 = 3.0346$$

$$T2 = \text{antilog } 3.0346 = 1082$$

$$T2 = 1082^\circ \text{ K.} = 809^\circ \text{ C.}$$

The other pressures and temperatures have been computed by the Sears-Zemansky's equation and follow the same logical reasoning. The applicant considers unnecessary to repeat them.

What is claimed is:

1. A device for converting to operation by air pressure a conventional internal combustion engine having at least one cylinder and piston operably connected to a crankshaft, and exhaust manifold and a spark plug opening, said engine operating on an admission, compression, work, exhaust stroke cycle, said device comprising first and second fluid pressure reservoirs interconnected through first one-way valve means permitting fluid flow from the first to the second reservoir but not in the reverse direction, a pressure relief valve in said second reservoir, a first fluid passage connecting said exhaust manifold and said first reservoir and into which all of the exhaust fluid from said cylinder flows during the exhaust stroke, a second one-way valve in said first fluid passage enabling the flow of exhaust fluid in said first passage to said first reservoir but not in the reverse direction, a compressor in said first fluid passage between said exhaust manifold and said second one-way valve and operable by a power source separate from said engine to compress at all times all of the exhaust fluid in said first fluid passage into said first reservoir through said second one-way valve, a second fluid passage between said second reservoir and said spark plug opening, a third valve biassed to closed position in said second passage to control the flow of fluid from said second reservoir to said spark plug opening, and means for opening said third valve in timed sequence substantially at the commencement of the work stroke of said engine.

2. A device according to claim 1 constructed and arranged to convert a multi-cylinder engine including a plurality of second fluid pressure reservoirs one for each cylinder of said engine and a plurality of third valves, one for each cylinder of said engine.

3. A device according to claim 1 including valve means for controlling the flow of fluid between said first reservoir and atmosphere, and means for manually selectively operating said valve means to control the flow of fluid from said first reservoir to said second reservoir and consequently the speed of operation of said engine.

4. A device according to claim 1 wherein said compressor has a capacity to increase the work potential of the exhaust gases received thereby to substantially the same amount as the net of usable work output of said engine.

* * * * *